(12) United States Patent
Berthome et al.

(10) Patent No.: US 9,513,050 B2
(45) Date of Patent: Dec. 6, 2016

(54) APPARATUS AND METHOD FOR THE DISTILLATION SEPARATION OF A MIXTURE CONTAINING CARBON DIOXIDE

(75) Inventors: Bruno Berthome, Paris (FR); Laurent Perru, Maurecourt (FR); Fabrice Rivoal, Vitry sur Seine (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 505 days.

(21) Appl. No.: 13/582,090

(22) PCT Filed: Feb. 11, 2011

(86) PCT No.: PCT/FR2011/050288
§ 371 (c)(1),
(2), (4) Date: Aug. 31, 2012

(87) PCT Pub. No.: WO2011/107685
PCT Pub. Date: Sep. 9, 2011

(65) Prior Publication Data
US 2012/0324942 A1    Dec. 27, 2012

(30) Foreign Application Priority Data
Mar. 1, 2010 (FR) .................... 10 51429

(51) Int. Cl.
*F25J 3/02*     (2006.01)
*F25J 5/00*     (2006.01)

(52) U.S. Cl.
CPC ............. *F25J 3/0209* (2013.01); *F25J 3/0219* (2013.01); *F25J 3/0223* (2013.01); *F25J 3/0266* (2013.01);
(Continued)

(58) Field of Classification Search
CPC ...... F25J 3/0209; F25J 3/0266; F25J 3/04872; F25J 3/04884; F25J 3/0271; F25J 3/0276; F25J 3/0219; F25J 2200/70; F25J 2200/72; F25J 2200/74; F25J 2200/76; F25J 2250/02; F25J 2250/04; F25J 2250/30
(Continued)

(56) References Cited

U.S. PATENT DOCUMENTS 3,317,278 A     5/1967    Ruhemann et al.
4,704,146 A *   11/1987   Markbreiter et al.  . F25J 3/0209
                                                      62/625
(Continued)

FOREIGN PATENT DOCUMENTS

WO    WO 2010006934 A2 *   1/2010

*Primary Examiner* — Frantz Jules
*Assistant Examiner* — Brian King
(74) *Attorney, Agent, or Firm* — Justin K. Murray

(57) ABSTRACT

The invention relates to an apparatus for the distillation separation of a mixture containing, as the main components thereof, carbon dioxide and at least one other fluid selected from the group containing nitrogen, oxygen, argon, hydrogen, methane, carbon monoxide, said apparatus comprising a distillation column (8), a condenser (9), a reboiler (7, 11), means for conveying the mixture to be separated to the column or the condenser, means for conveying a head gas from the column to the condenser, and means for conveying a liquid condensed in the condenser into the head of the column. The condenser is formed by an exchanger with plates and blades made from brazed aluminum and having an exchange surface area per $m^3$ of exchanger greater than 400 $m^2/m^3$, with ammonia being used as refrigerant.

20 Claims, 2 Drawing Sheets

Figure 1:
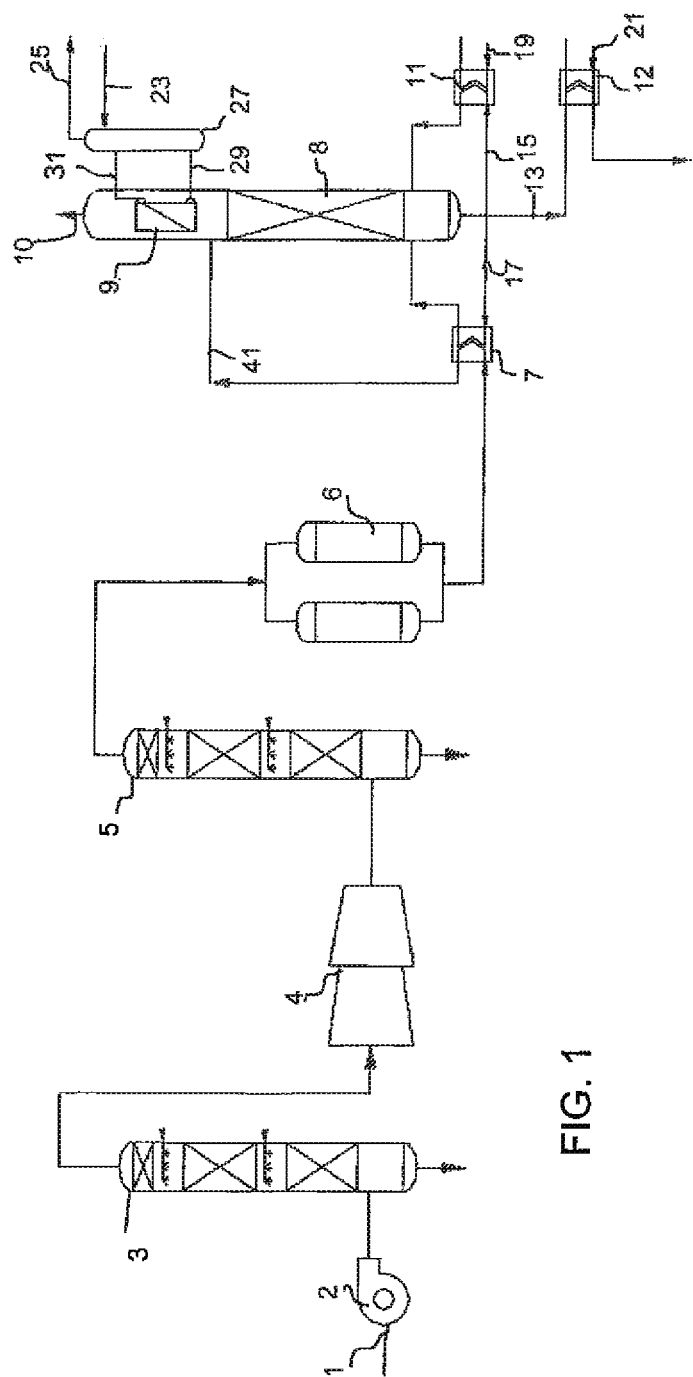

(52) U.S. Cl.
CPC ............. *F25J 5/005* (2013.01); *F25J 2200/02* (2013.01); *F25J 2200/40* (2013.01); *F25J 2200/74* (2013.01); *F25J 2210/12* (2013.01); *F25J 2210/70* (2013.01); *F25J 2215/04* (2013.01); *F25J 2220/80* (2013.01); *F25J 2220/82* (2013.01); *F25J 2230/30* (2013.01); *F25J 2250/02* (2013.01); *F25J 2250/20* (2013.01); *F25J 2270/90* (2013.01); *F25J 2290/12* (2013.01); *F25J 2290/34* (2013.01); *Y02C 10/12* (2013.01)

(58) Field of Classification Search
USPC ......................................................... 62/618
See application file for complete search history.

(56) References Cited

U.S. PATENT DOCUMENTS

| | | | |
|---|---|---|---|
| 5,120,338 A * | 6/1992 | Potts et al. ........................ | 62/629 |
| 5,974,829 A * | 11/1999 | Novak et al. ..................... | 62/617 |
| 6,070,431 A * | 6/2000 | Howard ................... | C01B 31/20 |
| | | | 62/620 |
| 8,216,351 B2 * | 7/2012 | Shah et al. ........................ | 96/242 |
| 2002/0011331 A1 * | 1/2002 | Lehman ................... | F25J 5/002 |
| | | | 165/166 |
| 2003/0150602 A1 * | 8/2003 | Davidian .............. | F25J 3/04412 |
| | | | 165/166 |
| 2010/0018248 A1 * | 1/2010 | Fieler et al. ..................... | 62/617 |
| 2010/0024475 A1 * | 2/2010 | Jeong et al. ...................... | 62/612 |

* cited by examiner

APPARATUS AND METHOD FOR THE DISTILLATION SEPARATION OF A MIXTURE CONTAINING CARBON DIOXIDE

CROSS-REFERENCE TO RELATED APPLICATIONS

This application is a §371 of International PCT Application PCT/FR2011/050288 filed Feb. 11, 2011, which claims §119(a) foreign priority to French patent application 1051429,filed Mar. 1, 2010.

Field of the Invention

The present invention relates to a device and to a process for the separation by distillation of a carbon dioxide mixture.

Related Art

It is known to separate mixtures comprising carbon dioxide and at least one other gas by distillation at subambient temperatures. The reflux at the top of the column is produced by condensation of least a portion of the top gas from the column. Currently, the liquefaction of the top gas of a column for the separation of a mixture comprising carbon dioxide is carried out using a condenser of shell-and-tube type made of stainless steel, as illustrated in U.S. Pat. No. 3,317,278. This exchanger, which has the advantageous distinctive features of resistance to high pressures and of free expansion of the tubes and body, and which accepts all types of powers, has several disadvantages, such as the bulk and the cost price.

The use of the technology consisting of an exchanger of shell-and-tube type to liquefy the top gas from the column requires the use of a heavy and expensive support having a ground occupancy of the order of 30 m². With a condenser length of more than 10 m, the optimization of the assembling of the equipment and the incorporation on site are complicated to carry out, requiring the hiring of a crane and specific lifting means in the event of maintenance.

Subsequently, the distillation process often involves an ammonia cooling circuit. The bigger the exchanger, the more the volume of cooling agent is increased, which conflicts with the current strategy of reducing the volumes of ammonia on industrial sites.

Finally, the heat exchange between $CO_2$ and ammonia is not very efficient with shell-and-tube technology.

SUMMARY OF THE INVENTION

The present invention preferably applies to mixtures comprising carbon dioxide where the carbon dioxide constitutes at least 90% of the total. At least one other constituent of the mixture can be chosen from the group consisting of nitrogen, methane, oxygen and argon. All the percentages are molar percentages.

The mixture to be separated can be the waste gas from an oxy-combustion, an iron- and steel-manufacturing process, the production of bioethanol or the treatment of syngas or gas resulting from fermentation or a cement works.

According to a subject matter of the invention, provision is made for a device for the separation by distillation of a mixture comprising, as main components, carbon dioxide and at least one other fluid chosen from the group consisting of nitrogen, oxygen, argon, hydrogen, methane and carbon monoxide, comprising a distillation column, a condenser, a reboiler, means for sending the mixture to be separated to the column or to the condenser, means for sending a top gas from the column to the condenser and means for sending a liquid condensed in the condenser to the top of the column, the condenser being composed of a plate and fin exchanger made of brazed aluminum and having an exchange surface area per m³ of exchanger of greater than 400 m²/m³ and the condenser being placed in a bath of liquid coolant which is ammonia.

According to other optional characteristics:
- the condenser is connected to means for feeding liquid or two-phase ammonia;
- the condenser is placed above the column, in use
- the greatest dimension of the exchanger forming the condenser is along a substantially vertical axis, in use.

According to another subject matter of the invention, provision is made for a process for the separation by distillation of a mixture comprising, as main components, carbon dioxide and at least one other fluid chosen from the group consisting of nitrogen, oxygen, argon, hydrogen, methane and carbon monoxide, in an assembly comprising a distillation column, a condenser and a reboiler, in which the mixture to be separated is sent to the column or to the condenser, a top gas from the column heats the condenser, is liquefied and is returned to the column, the condenser being composed of a plate and fin exchanger made of brazed aluminum and having an exchange surface area per m³ of exchanger of greater than 400 m²/m³ and the condenser being cooled by sending a flow of ammonia to the condenser.

Optionally, the vessel of the column is heated by means of the mixture to be separated before sending the mixture to be separated to the column or to the condenser.

The condenser can be in a bath of ammonia.

Liquid or two-phase ammonia can be reheated in the condenser.

The liquid or two-phase ammonia can originate from a tank and ammonia evaporated in the condenser can be returned to the tank.

The gases which do not condense in the condenser can be vented off.

A portion of the vessel liquid of the column can be withdrawn from the column as product.

Preferably, no portion of the vessel liquid of the column is sent to the condenser.

The mixture can comprise at least 90% of carbon dioxide.

DETAILED DESCRIPTION OF THE INVENTION

The invention will be described in more detail with reference to the figures, FIGS. 1 to 3 of which represent separation devices according to the invention.

FIG. 1 represents a device for the separation of a mixture having, as main components, carbon dioxide, alcohols, hydrogen, oxygen, argon, nitrogen, and carbon monoxide and other impurities. Between 2000 and 5000 Nm³/h of the mixture resulting from industrial sources of bioethanol or syngas production type enters a pipe 1 and is compressed in a compressor 2. Reheated to approximately 80° C. (not illustrated), the mixture is subsequently cooled and washed by direct contact, in a first washing tower 3, with controlled water of food grade cooled by indirect contact with ammonia. During the washing process, a portion of the soluble impurities, such as the alcohols and the volatile oxygen-comprising components, are absorbed in the water and bled off. Subsequently, the mixture originating from the first washing tower is compressed to approximately 20 bara by the compressor 4 and is introduced into the second washing tower 5, where the remaining impurities and the traces of oxygen-comprising molecules are largely absorbed.

The mixture washed in the second washing tower is subjected to a purification stage by passing through a purification unit 6 composed of several beds of active charcoals and of alumina having the role of stopping the group of aliphatic, oxygen-comprising and aromatic hydrocarbons, sulfur and nitrogen compounds, traces of oils and polar particles, such as water. On leaving the purification unit 6, the mixture 41 is dry and in accordance with the ISBT (International Society of Beverage Technologists) quality standard, apart from the noncondensable products, such as hydrogen, oxygen, argon, nitrogen and carbon monoxide, which will be vented off during the distillation process.

Subsequently, the mixture 41 originating from the purification unit 6 enters the cold box (not illustrated), is cooled in a first exchanger 7 and is introduced at the top of the distillation column 8. The distillation column is a column comprising stacked packings or plates. The mixture 41, comprising at least 90% of carbon dioxide, enters the column in the gaseous state and then largely passes into the condenser 9. The condenser 9 is composed of a plate and fin exchanger made of brazed aluminum, oriented with its greatest dimension in the vertical direction and placed above the column 8. Whereas the carbon dioxide in the mixture is condensed in the condenser 9, the lighter gases (oxygen, nitrogen, argon, carbon monoxide) remain non-condensable and largely depart from the condenser 9 via the venting pipe 10. The traces of noncondensable products present in the liquid $CO_2$ condensed in the condenser 9 are removed by distillation in order to obtain the required purity in the column vessel.

The condensation of the mixture in the condenser 9 is carried out by evaporation of ammonia, at 1.1 bara and −31.8° C. The liquid ammonia 23 is sent to a tank 27 which feeds the condenser via the bottom by means of a pipe 29. The ammonia evaporates in the condenser by exchange of heat with the top gas of the column and exits gaseous via the pipe 31, which returns the gas to the top of the tank 27. The gas in the tank is circulated to a cooling circuit by means of the pipe 25.

A liquid rich in carbon dioxide is produced in the vessel of the column. A portion 13 of this liquid is used as product after subcooling in the exchanger 12 with a flow of ammonia 21 and is then reduced in pressure down to 16 bara.

Another portion 15 of the flow rich in carbon dioxide is heated in an exchanger 11 against liquid ammonia 19 and the gas rich in carbon dioxide produced is returned to the column.

Another portion 17 of the flow rich in carbon dioxide is heated in an exchanger 7 against the feed mixture originating from the purification unit 6 and the gas rich in carbon dioxide produced is returned to the top of the column, as already described.

The purity of the carbon dioxide is regulated by the exchangers 7 and 11, which act as reboilers.

Figure 2:
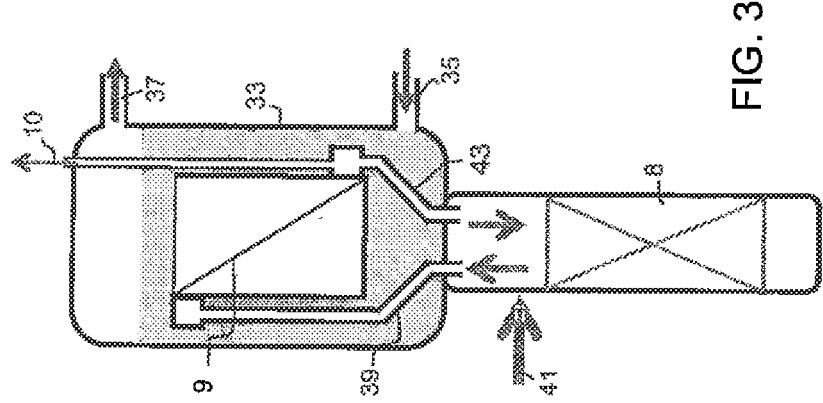
Figure 3:
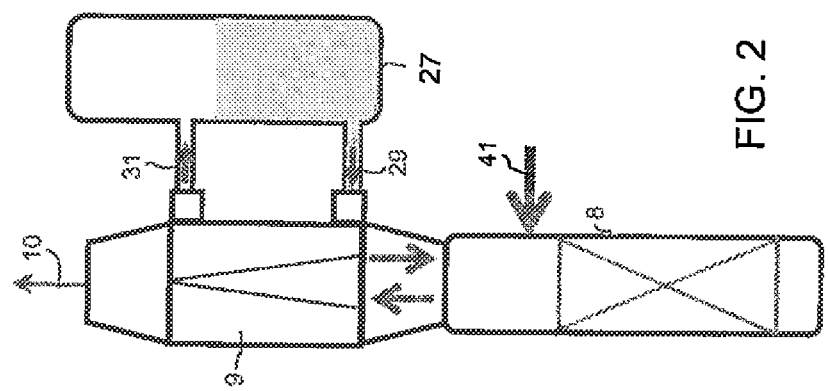

FIGS. 2 and 3 illustrate two alternative forms for the separation device. In FIG. 2, the condenser 9 is of the thermosiphon type. The condenser 9 surmounts the column and the gas rises towards the condenser 9 by means of an extension of the column which allows gas to rise and liquid to descend. The condenser is connected to the ammonia tank 27 by means of the pipes 29 and 31 already described for FIG. 1. The condenser 9 is a plate and fin exchanger made of brazed aluminum and having an exchange surface area per m³ of exchanger of greater than 400 $m^2/m^3$.

The mixture 41 is sent either to the top of the column 8 or to the inlet of the condenser 9.

For FIG. 3, the condenser 9 is placed in a bath 33 of refrigerating fluid, in this case ammonia. The condenser 9 is a plate and fin exchanger made of brazed aluminum and having an exchange surface area per m³ of exchanger of greater than 400 $m^2/m^3$.

The mixture to be separated 41 is sent either to the top of the column 8 or to the inlet of the condenser 9 via the pipe 39.

The top gas is conveyed to the condenser by means of a pipe 39 connecting the top of the condenser to the top of the column 8. The liquid condensed in the condenser returns to the column by means of a pipe 43, while another pipe 10 provides for the venting of the noncondensable products. An inlet 35 feeds the bath 33 with refrigerating fluid and an outlet discharges the gas evaporated in the bath.

In both cases of FIGS. 2 and 3, the condenser 9 is positioned above the column 8 but other arrangements can be envisaged. FIGS. 2 and 3 do not show the vessel reboiler in order to simplify the drawing.

For the example of FIGS. 2 and 3, the column 8 operates at a pressure between 18 bare and 30 bara, higher pressures being possible but at the cost of more expensive equipment. The reboiler is not shown in these figures for the sake of simplicity.

The use of a plate and fin exchanger made of brazed aluminum makes it possible to reduce the overall weight of the device, to reduce the volume of ammonia used and to confine its use mainly to the cold box where the column is located, to reduce the ground occupancy of the device and to lower the cost thereof.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for the separation by distillation of a mixture comprising primarily carbon dioxide and at least one impurity selected from the group consisting of nitrogen, oxygen, argon, hydrogen, methane, carbon monoxide and combinations thereof, the device comprising:

a distillation column having a bottom section, a rectification section disposed above the bottom section, and a top section disposed above the rectification section, the distillation column being operable to produce a bottom fluid from the bottom section, wherein the bottom fluid comprises carbon dioxide and has a reduced amount of impurity as compared to the mixture;

a condenser having a gas inlet and a fluid outlet, the condenser being composed of a plate and fin exchanger made of brazed aluminum and having an exchange surface area per m³ of exchanger of greater than 400 $m^2/m^3$ and the condenser being placed in a bath of liquid ammonia, wherein the bath is connected to means for feeding liquid or two-phase ammonia, wherein the condenser is disposed above the top section of the distillation column;

a first reboiler;

a top gas conduit in fluid communication with the top section of the distillation column and the gas inlet of the condenser, such that the top gas conduit is configured to send a top gas from the distillation column to the gas inlet of the condenser;

a mixture inlet in fluid communication with the condenser, such that the mixture inlet is configured to introduce the mixture, without having been passed through the rectification section, to the condenser in the presence of the top gas from the distillation column;

a liquid conduit in fluid communication with the fluid outlet of the condenser and the top section of the distillation column, such that the liquid conduit is configured to return condensate from the condenser to the top section of the distillation column; and a non-condensable removal line in fluid communication with the fluid outlet of the condenser, the non-condensable removal line configured to remove non-condensables from the device.

2. The device of claim 1, wherein the first reboiler is in fluid communication with the bottom section, such that the first reboiler is configured to receive a first portion of the bottom fluid from the bottom section and heat the first portion of the bottom fluid before returning the first portion of the bottom fluid to the distillation column.

3. The device of claim 2, further comprising a second reboiler in fluid communication with the bottom section of the distillation column, such that the second reboiler is configured to receive a second portion of the bottom fluid from the bottom section and heat the second portion of the bottom fluid before returning the second portion of the bottom fluid to the distillation column.

4. The device of claim 3, wherein the first reboiler is in fluid communication with a first warming source having a first warming fluid and the second reboiler is in fluid communication with a second warming source having a second warming fluid, wherein the first warming fluid and the second warming fluid are not the same.

5. The device of claim 4, wherein the first warming fluid is ammonia.

6. The device of claim 4, wherein the second warming fluid is the mixture prior to being introduced to the top gas conduit.

7. The device of claim 1, wherein the greatest dimension of the exchanger forming the condenser is along a substantially vertical axis.

8. The device of claim 1, wherein the non-condensable removal line traverses through the bath of liquid ammonia before removing the non-condensables from the device.

9. The device of claim 1, wherein the condenser is surmounted on top of the top section of the distillation column.

10. The device of claim 1, wherein the top gas conduit traverses through the bath of liquid ammonia.

11. The device of claim 1, wherein the mixture and the top gas from the distillation column have a common entry to the condenser via the gas inlet of the condenser.

12. The device of claim 1, wherein the condenser is configured to condense all of the carbon dioxide that is condensed within the device.

13. A process for the separation by distillation of a mixture comprising primarily carbon dioxide and at least one impurity selected from the group consisting of nitrogen, oxygen, argon, hydrogen, methane, carbon monoxide and combinations thereof, the process comprising the steps of:
providing a device comprising:
a distillation column having a bottom section, a rectification section disposed above the bottom section, and a top section disposed above the rectification section, the distillation column being configured to produce a bottom fluid from the bottom section and a top gas in the top section, a condenser having a gas inlet and a fluid outlet, the condenser being composed of a plate and fin exchanger made of brazed aluminum and having an exchange surface area per $m^3$ of exchanger of greater than 400 $m^2/m^3$ and the condenser being placed in a bath of liquid ammonia, wherein the bath is connected to means for feeding liquid or two-phase ammonia, wherein the condenser is disposed above the top section of the distillation column, a first reboiler, and a top gas conduit in fluid communication with the top section of the distillation column and the gas inlet of the condenser;

introducing the mixture and the top gas to the condenser under conditions effective to at least partially condense the carbon dioxide within the mixture and the top gas to form a condensate and non-condensables, wherein the mixture does not undergo rectification within the distillation column prior to introduction to the condenser, wherein the mixture is single phase fluid in a gaseous state upon entering the condenser;

returning the condensate to the distillation column;

removing the non-condensables from the device using a non-condensable removal line, wherein the condenser removal line is in fluid communication with a fluid outlet of the condenser; and withdrawing the bottom fluid from the bottom section of the distillation column, wherein the bottom fluid comprises carbon dioxide and has a reduced amount of impurity as compared to the mixture.

14. The process of claim 13, wherein the first reboiler is in fluid communication with the bottom section, such that the first reboiler is configured to receive a first portion of the bottom fluid from the bottom section and heat the first portion of the bottom fluid before returning the first portion of the bottom fluid to the distillation column.

15. The process of claim 14, further comprising a second reboiler in fluid communication with the bottom section of the distillation column, such that the second reboiler is configured to receive a second portion of the bottom fluid from the bottom section and heat the second portion of the bottom fluid before returning the second portion of the bottom fluid to the distillation column.

16. The process of claim 15, wherein the first reboiler is in fluid communication with a first warming source having a first warming fluid and the second reboiler is in fluid communication with a second warming source having a second warming fluid, wherein the first warming fluid and the second warming fluid are not the same.

17. The process of claim 16, wherein the first warming fluid is ammonia.

18. The process of claim 16, wherein the second warming fluid is the mixture prior to being introduced to the top gas conduit.

19. The process of claim 13, wherein the mixture comprises at least 90% of carbon dioxide.

20. The process of claim 13, wherein no portion of the bottom fluid of the distillation column is sent to the condenser.

\* \* \* \* \*